United States Patent [19]
Shafer et al.

[11] Patent Number: 5,925,707
[45] Date of Patent: Jul. 20, 1999

[54] OIL GEL FORMULATIONS CONTAINING HIGH VINYL CONTENT HYDROGENATED STYRENE-BUTADIENE-STYRENE BLOCK COPOLYMERS

[75] Inventors: David Lee Shafer; Glenn Roy Himes; Michael John Modic, all of Houston, Tex.

[73] Assignee: Shell Oil Company, Houston, Tex.

[21] Appl. No.: 08/903,526

[22] Filed: Jul. 30, 1997

Related U.S. Application Data

[60] Provisional application No. 60/022,834, Jul. 31, 1996.

[51] Int. Cl.⁶ ...................................................... C08J 5/01
[52] U.S. Cl. ............................................ 524/490; 523/173
[58] Field of Search ........................... 523/173; 524/490; 525/314, 332.9, 339

[56] References Cited

U.S. PATENT DOCUMENTS

| | | | |
|---|---|---|---|
| Re. 27,145 | 6/1971 | Jones | 260/880 |
| 3,700,748 | 10/1972 | Winkler | 260/879 |
| 3,827,999 | 8/1974 | Crossland | 260/33.6 |
| 3,830,767 | 8/1974 | Condon . | |
| 4,833,193 | 5/1989 | Sieverding | 524/486 |
| 4,880,878 | 11/1989 | Himes et al. | 525/89 |
| 5,191,024 | 3/1993 | Shibata et al. | 525/314 |
| 5,300,582 | 4/1994 | Debier et al. | 525/314 |
| 5,360,350 | 11/1994 | Koblitz et al. | 439/276 |
| 5,508,334 | 4/1996 | Chen | 524/474 |

FOREIGN PATENT DOCUMENTS

| | | | |
|---|---|---|---|
| 0058022 A1 | 2/1982 | European Pat. Off. . | |
| 06293853 | 10/1994 | Japan | C08K 5/00 |
| 6293853 | 10/1994 | Japan . | |
| WO 91/05014 | 4/1991 | WIPO . | |
| 93/05113 | 3/1993 | WIPO | C08L 53/00 |
| 93/23472 | 11/1993 | WIPO | C08L 53/02 |
| 94/18273 | 8/1994 | WIPO | C08L 101/00 |

OTHER PUBLICATIONS

European Search Report of Mar. 11, 1997.

*Primary Examiner*—Robert Dawson
*Assistant Examiner*—D. Aylward
*Attorney, Agent, or Firm*—Donald F. Haas

[57] ABSTRACT

This invention provides oil gel compositions which comprise a hydrogenated styrene-butadiene-styrene (SEBS) block copolymer (although other vinyl aromatic hydrocarbons may be used) which has an overall weight average molecular weight of from 30,000 to 300,000, a styrene block weight average molecular weight of from 4000 to 35,000, and a vinyl content of at least 45% by weight (% wt), preferably 45 to 90%, and an oil and, optionally, a polyolefin wax and/or an extender liquid. For every 100 parts by weight of copolymer, there should be at least 900 parts of oil or a mixture of oil and polyolefin wax and/or an extender liquid.

4 Claims, No Drawings

OIL GEL FORMULATIONS CONTAINING HIGH VINYL CONTENT HYDROGENATED STYRENE-BUTADIENE-STYRENE BLOCK COPOLYMERS

CROSSREFERENCE TO RELATED APPLICATION

This application claims the benefit of U.S. Provisional Application Ser. No. 60/022,834, filed Jul. 31, 1996.

FIELD OF THE INVENTION

This invention relates to oil gel compositions for use as filling compounds in wire and cable applications. More particularly, this invention relates to such compositions containing new high vinyl content hydrogenated styrene-butadiene-styrene (SEBS) block copolymers and to the polymers themselves.

BACKGROUND OF THE INVENTION

There are at least three major criteria in formulating an oil gel for cables. The oil gel must possess some degree of slump resistance at high service temperatures. Additionally, the gel needs to be strippable so that installers and repairmen can make electrical splices easily in the field. Also, the oil gel should have a good working viscosity in the melt so it can be easily pumped into the cable.

Filling compounds used to prevent the ingress of water into telecommunications cable must have processing characteristics which allow the material to penetrate and fill the voids between densely packed insulated conductors. Application viscosity is critical and the ability to adjust the viscosity by temperature is limited by potential damage to the insulation on the copper conductors. Once the cable is filled, the filling compound must not flow out at temperatures of up to 80° C., must withstand significant heads of water, should have good craft handling characteristics, must be compatible with other components in the cable system such as splice encapsulants, and should not significantly add to the stiffness of the cable.

Lower molecular weight polymers like KRATON® G1650, G1726, and G1652 polymers are used in the cable filling industry. KRATON® G1650 and G1652 polymers possess good strippability benefits (as measured by oil gel tear strengths), and are of low enough viscosity to pump into the cable and fill all the crevices between bundles of wire in cables. The major problem with KRATON® G1650 and G1652 polymers is that these polymers in oil gel formulations do not perform well at high service temperatures. This is due to the relatively low molecular weight of the polystyrene endblocks.

Higher molecular weight versions like KRATON® G 1651 and G1654 polymers show promise for excellent service temperature performance. The large styrene endblocks are much more resistant to flow (and loss of elasticity), thus giving high service temperature performance. The large endblocks also help produce oil gels which, under some conditions, can be difficult to strip (high tear resistance), and prevent flow at service temperatures. Unfortunately, oil gels based on KRATON® G1651 and G1654 polymers have poor adhesion and their viscosity is too high at application temperatures to allow the gel to flow properly between the bundles of wires in a cable. Therefore, KRATON® G1651 and G1654 polymers is not used extensively in cable filling applications.

This invention provides the advantages of both low molecular weight polymers and higher molecular weight polymers while minimizing their disadvantages. Using the high vinyl content polymers of the present invention in an oil gel application allows oil gel formulators to manufacture gels with high service temperature properties in a strippable and pumpable form. The present wisdom in this art suggests that high service temperatures and a reduction of application viscosity may be mutually exclusive for oil gels. This invention provides a novel way to produce compositions which exhibit both of these characteristics. Using high vinyl content polymers as opposed to the lower vinyl content polymers discussed above fortifies the viscosity/concentration relationship of the polymers, i.e. lower viscosity with other properties remaining about the same.

SUMMARY OF THE INVENTION

This invention provides oil gel compositions which comprise a hydrogenated styrene-butadiene-styrene (SEBS) block copolymer which has an overall weight average molecular weight of from 30,000 to 300,000, (preferably 40,000 to 220,000 and most preferably 60,000 to 220,000), a styrene block weight average molecular weight of from 4,000 to 35,000, (preferably 6000 to 33,000 and most preferably 9000 to 33,000), and a vinyl content of at least 45% by weight (% wt), preferably 45 to 90%, and an oil and, optionally, thickeners such as polyolefin wax, silica gel, fumed silica, fatty acid soaps and extender liquids such as poly(alpha-olefins). For every 100 parts by weight of copolymer, there should be at least 900 parts of oil or a mixture of oil and a polyethylene wax and/or an extender liquid.

DETAILED DESCRIPTION OF THE INVENTION

The endblocks of these novel copolymers are polymer blocks of styrene. Other vinyl aromatic hydrocarbons, including alphamethyl styrene, various alkyl-substituted styrenes, alkoxy-substituted styrenes, vinyl naphthalene, vinyl toluene and the like, can be substituted for styrene and are expressly included in this invention.

The butadiene used herein must produce a polymer block with a high vinyl content. In other words, the percent of 1,2 addition of the butadiene should be at least 45% wt, preferably 45 to 90%, more preferably 60 to 90%, and most preferably 65 to 80%. Below 45% wt, polymer viscosity is similar to conventional polymers and there is no advantage. Above 90% the viscosity decrease has reached a plateau and no longer drops with higher 1,2 content; therefore, there is no further advantage.

The term "vinyl content" refers to the fact that a conjugated diene is polymerized via 1,2-addition (in the case of butadiene—it would be 3,4 addition in the case of isoprene). Although a pure "vinyl" group is formed only in the case of 1,2 addition polymerization of 1,3 butadiene, the effects of 3,4 addition polymerization of isoprene (and similar addition for other conjugated dienes) on the final properties of the block copolymer will be similar. The term "vinyl" refers to the presence of a pendant vinyl group on the polymer chain. The chain branching thus introduced reduces the length of the main polymer backbone, since some of the carbons in the diene are in the pendant groups. The shorter chain length reduces polymer viscosity. The pendant groups reduce ability of the polymer molecules to form crystalline structures.

Anionic polymerization of conjugated diene hydrocarbons with lithium initiators is well known as described in U.S. Pat. No. 4,039,593 and U.S. Pat. No. Re. 27,145 which descriptions are incorporated herein by reference. Polymerization commences with a monolithium, dilithium, or polylithium initiator which builds a living polymer backbone at each lithium site. Typical living polymer structures containing polymerized conjugated diene hydrocarbons are:

X—B—Li
X—A—B—Li
X—A—B—A—Li
Li—B—Y—B—Li
Li—A—B—Y—B—A—Li wherein B represents polymerized units of one or more conjugated diene hydrocarbons such as butadiene or isoprene, A represents polymerized units of one or more vinyl aromatic compounds such as styrene, X is the residue of a monolithium initiator such as sec-butyllithium, and Y is the residue of a dilithium initiator such as the diadduct of sec-butyllithium and m-diisopropenylbenzene. Some structures, including those pertaining to polylithium initiators or random units of styrene and a conjugated diene, generally have limited practical utility although known in the art.

The anionic polymerization of the conjugated diene hydrocarbons is typically controlled with structure modifiers such as diethylether or ethyl glyme (1,2-diethoxyethane) to obtain the desired amount of 1,2-addition. As described in U.S. Pat. No. Re. 27,145 which is incorporated by reference herein, the level of 1,2-addition of a butadiene polymer or copolymer can greatly affect elastomeric properties after hydrogenation. The 1,2-addition of butadiene polymers significantly and surprisingly influences the polymer as described above. A 1,2-addition of about 40% is achieved during polymerization at 50° C. with about 6% by volume of diethylether or about 200 ppm of ethyl glyme in the final solution. A 1,2 addition of about 47% (within the scope of this invention) is achieved during polymerization by the presence of about 250 ppm of ortho-dimethoxybenzene (ODMB) in the final solution. A 1,2 addition of 78% (within the scope of this invention) is achieved during polymerization by the presence of about 300 ppm of 1,2-diethoxypropane (DEP) in the final solution.

One of the benefits of polymers of high vinyl content as defined in this specification is improved clarity of oil gels containing such polymers. This is a particularly valuable characteristic for oil gels formulated for applications requiring good appearance. The improvement derives from the reduced concentration of crystalline polyethylene which is formed when butadiene polymerizes in the 1,4 (head-to-tail) orientation repeatedly and is hydrogenated to polyethylene. Concentration of polyethylene crystals decreases with increasing 1,2 addition (i.e., vinyl content) and goes to zero above about 55% vinyl content.

In general, the polymers useful in this invention may be prepared by contacting the monomer or monomers with an organoalkali metal compound in a suitable solvent at a temperature within the range from −150° C. to 300° C., preferably at a temperature within the range from 0° C. to 100° C. Particularly effective polymerization initiators are organolithium compounds having the general formula:

RLi wherein R is an aliphatic, cycloaliphatic, alkyl-substituted cycloaliphatic, aromatic or alkyl-substituted aromatic hydrocarbon radical having from 1 to 20 carbon atoms.

Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane, heptane and the like, cycloaliphatic hydrocarbons such as cyclohexane, cycloheptane and the like, alkyl-substituted cycloaliphatic hydrocarbons such as methylcyclohexane, methylcycloheptane and the like, aromatic hydrocarbons such as benzene and the alkyl-substituted aromatic hydrocarbons such as toluene, xylene and the like and ethers such as tetrahydrofuran, diethylether, di-n-butyl ether and the like.

The hydrogenation of these polymers may be carried out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the present of a soluble hydrogenation catalysts. Such processes are disclosed in U.S. Pat. Nos. 3,113,986, 4,226,952 and U.S. Pat. No. Reissue 27,145, the disclosures of which are herein incorporated by reference. The polymers are hydrogenated in such a manner as to produce hydrogenated polymers having a residual unsaturation content in polydiene blocks of less than about 1 percent, and preferably as close to 0 percent as possible, of their original unsaturation content prior to hydrogenation. A titanium catalyst such as disclosed in U.S. Pat. No. 5,039,755, which is herein incorporated by reference, may also be used in the hydrogenation process.

The molecular weights of linear polymers or unassembled linear segments of polymers such as mono-, di-, triblock, etc., or the arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. The materials used in the columns of the GPC are styrene-divinyl benzene gels or silica gels. The solvent is tetrahydrofuran and the detector is a refractive index detector.

The invention accordingly provides an oil gel composition comprising a styrene-alkylene-styrene block copolymer whose polyalkylene blocks comprise ethylene/butylene units and an oil, and optionally may include a polyolefin wax and/or an extender liquid which liquid is a poly(alpha-olefin) and extends and softens the polybutadiene blocks of the copolymer. For every 100 parts by weight (pbw) of copolymer, there should be at least 900 pbw of total polyolefin wax plus oil and/or extender liquid to achieve the low viscosity and economics required for oil gel applications although it is possible to go as low as 300 pbw for some applications. No more than 4900 pbw wax/oil/extender liquid per 100 parts polymer can be used or the polymer will not thicken the composition properly and will not retain oil well enough to prevent oil bleed during service. More preferably, the amount is 1400 to 4850 pbw and most preferably, it is 1600 to 2500. The oils which can be used include, for example, paraffinic oils, mineral oils, naphthenic oils, and those available from Shell Oil Company under its trademark SHELLFLEX®, Kaydol oil produced by Witco, and Fina Chemicals under the trade mark Vestan A360B. Drakeol 34 oil from Penreco and Witco 380P0 oil from Witco can also be used. If it is used, the extender liquid will generally make up at least 5% wt of the total oil/extender liquid portion but no more than about 50% wt because the polymer may not be able to retain larger proportions due to limited compatibility.

The polyolefin wax component of oil gels, if used, generally is low molecular weight polyethylene. Suitable grades are manufactured by Allied under the A-C trade name, by Quantum Chemical under Petrothene, and Eastman Chemical Products under Epolene. The content of polyethylene wax is usually 3 to 10% of the total composition. More than 10% reduces the oil retention capability of the composition and less than 3% increases the cost of the polymer package.

The poly(alpha-olefin) extender liquids useful in the compositions of this invention comprising the block copolymer may be selected from those available by simple trial and error. Examples include those available from Ethyl Corporation under the trade mark "Ethylflo". The extenders preferably have a minimum boiling point higher than the softening point of the block copolymer. Commercially available grades include "Ethylflo 164", "Ethylflo 166", "Ethylflo 168", and "Ethylflo 170".

These compositions are generally prepared by mixing the oil and the polymer together with some kind of mechanical mixing aid and optionally with the aid of a volatile solvent. When the extender liquid is used, it is usually mixed with these components at a temperature not less than the glass transition temperature of the polystyrene blocks of the copolymer. It may be useful to use various additives such as stabilizers, antioxidants, tackifiers, and the like.

EXAMPLES

PP5181 is an SEBS Block copolymer with a high vinyl content. Its molecular characteristics are compared with those of Polymer A in Table 1 below. It can be seen that they are very similar except for the vinyl content. The other polymers have different characteristics.

PP5828, shown below, is similar to Polymer B except 78% of its rubber block is in a 1,2 microstructure, compared to 38% for Polymer B. The flow properties of PP5828 are dramatically better than Polymer B as indicated by solution viscosity (two orders of magnitude lower) and much higher melt flow indices. Similarly, PP5823 (78% 1,2 addition) exhibits much better flow properties than Polymer C, which has 38% 1,2 addition. PP5819 has an intermediate level of 1,2 structure (47%), but is still markedly better in flow properties than Polymer C. The high flow characteristics mean that pumpability of oil gel formulations made from high vinyl polymers is far superior to conventional block polymers.

The higher glass transition temperatures (see Table 2) of the high 1,2 polymers is a natural consequence of high 1,2 structure. They are still well below the approximate low temperature use requirement of −10° C. for cable filling compounds.

TABLE 1

| Polymer | Polymer MW | Block MWs, 1000's | Vinyl Content of butadiene block | Styrene content of whole polymer |
|---|---|---|---|---|
| PP5181 | 205,800 | 27.5-144.6-33.5 | 75.2% | 26.3% |
| Polymer A | 181,000 | 29.0-123-29.0 | 38% | 32% |
| PP5828 | 56,000 | 10-39-10 | 78% | 29.6% |
| Polymer B | 67,000 | 10-47-10 | 38% | 29.9% |
| PP5823 | 35,000 | 6-23-6 | 78% | 29.3% |
| PP5819 | 38,000 | 6-26-6 | 47% | 29.5% |
| Polymer C | 50,000 | 7.5-35-7.5 | 38% | 30% |
| Polymer D | 126,000 | 19-89-19 | 35% | 30% |

TABLE 2

| Polymer | Toluene Soln. Visc. 25° C., cps | Melt Flow Index, g/10 min 200° C., 5 kg | Melt Flow Index, g/10 min 230° C., 5kg | Glass Transition Temp° C. Rubber Block |
|---|---|---|---|---|
| PP5181 | 70 (10% solids) | — | — | −38 |
| Polymer A | 1850 (10% solids) | <1 | <1 | −58 |
| PP5828 | 99 (25% solids) | 9.7 | 48.4 | −32 |
| Polymer B | 9610 (25% solids) | <1 | <1 | −58 |
| PP5823 | 37 (25% solids) | 359 | >400 | −32 |
| PP5819 | 389 (25% solids) | 19.9 | 83 | −52 |
| Polymer C | 1670 (25% solids) | <1 | 5.7 | −58 |

The oil gel samples for Formulation #1 (below) were prepared by adding 6% by weight of polymer to Kaydol mineral oil in a Silverson mixer @ 100 degrees Centigrade. The samples were mixed until fully dissolved and poured out into a release lined boat to approximately 0.2 inches thick. When problems existed during mixing that prevented good incorporation of the polymer, temperature was raised in the mixer until a uniform mixture was achieved. Samples were then cut and tested for tear resistance in accordance with ASTM method D624.

The oil gel samples for Formulation #2 were prepared by adding 6% by weight of polymer to Kaydol mineral oil in a Silverson mixer @ 100 degrees Centigrade. Additionally, 6% AC9 polyethylene wax was added to the formulation. The samples were mixed until fully dissolved and poured out into a release lined boat to approximately 0.2 inches thick. When problems existed during mixing that prevented good incorporation of the polymer in the oil, the temperature was raised in the mixer until uniform mixing was achieved. Samples were then cut and tested for tear resistance in accordance with ASTM method D624. Melt viscosities were run on selected gels. Additionally, DMA temperature sweeps were run to determine the temperature at which the gel began to fall apart (via elastic modulus loss).

TABLE 3

| Polymer | Tear Strength Formulation #1 (lb/in) | Tear Strength Formulation #2 (lb/in) | Melt Viscosity Formulation #2 at 350° F. | Approx. Temp. of Elasticity Loss Formulation #2 |
|---|---|---|---|---|
| Polymer A | 1.937 1.637 | 5.204 | 15,000 cps | 90–95° C. |

TABLE 3-continued

| Polymer | Tear Strength Formulation #1 (lb/in) | Tear Strength Formulation #2 (lb/in) | Melt Viscosity Formulation #2 at 350° F. | Approx. Temp. of Elasticity Loss Formulation #2 |
|---|---|---|---|---|
| Polymer D | 1.435 | 3.441 | 200 cps | 85–90° C. |
| Polymer B | — | 1.017 | 23 cps | 75–80° C. |
| Polymer C | 0.138 | 0.967 | 20 cps | 60–70° C. |
| PP-5181 | 0.189 | 0.884 | 1200 cps | 90–95° C. |

Notes:
1. Tear Strength determined by ASTM method D624, using 0.2 inch thick oil gels. Each value above is the average of 4–8 tests.
2. Formulation 1 contains 6% polymer, and 94% Kaydol oil.
3. Formulation 2 contains 6% Polymer, 6% PE Wax (AC-9 manufactured by Alied), and 88% Kaydol Oil.
4. The approximate temperature of elasticity loss is determined at the temperature at which the elastic modulus of the oil gel (as measured by DMA) drops off.

It can clearly be seen in Table 3 that the formulations with the higher molecular weight polymers (A and D) exhibit high tear strength—too high for them to be useful in a cable filling application. They do, however, have a high temperature of elasticity loss and thus should exhibit the high service temperature desired. The lower molecular weight polymer (B and C) formulations have the tear strength indicative of good strippability but their service temperatures are undesirably low. The formulation of this invention with polymer PP5181 has tear strength appropriate for good strippability and a high service temperature (as high as that of A, the high molecular weight polymer) while still maintaining an acceptable viscosity.

We claim:

1. A strippable, high service temperature oil gel composition which comprises:

(a) 100 parts by weight of a hydrogenated vinyl aromatic hydrocarbon-butadiene-vinyl aromatic hydrocarbon block copolymer which has an overall weight average molecular weight of from 30,000 to 300,000, a vinyl aromatic hydrocarbon block weight average molecular weight of from 4000 to 35,000, and wherein the diene block has a vinyl content of at least 45% by weight, and wherein the copolymer has a glass transition temperature of −30° C. or less, and (b) at least 900 parts by weight of an oil.

2. The oil gel composition of claim 1 wherein the vinyl aromatic hydrocarbon is styrene.

3. The oil gel composition of claim 2 wherein the vinyl content is from 45 to 90% by weight.

4. The oil gel composition of claim 2 wherein the oil is present in an amount of from 900 to 4900 parts by weight per 100 parts of copolymer.

* * * * *